United States Patent
Ishii et al.

(10) Patent No.: US 8,339,478 B2
(45) Date of Patent: Dec. 25, 2012

(54) IMAGE CAPTURING APPARATUS AND CONTROL METHOD THEREOF

(75) Inventors: Akiyoshi Ishii, Yokohama (JP); Yousuke Kamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 12/787,112

(22) Filed: May 25, 2010

(65) Prior Publication Data

US 2010/0328495 A1 Dec. 30, 2010

(30) Foreign Application Priority Data

Jun. 29, 2009 (JP) ................ 2009-153991

(51) Int. Cl.
*H04N 2/262* (2006.01)
*H04N 5/76* (2006.01)
*H04N 9/80* (2006.01)

(52) U.S. Cl. ............... 348/239; 348/231.99; 386/241; 386/242

(58) Field of Classification Search .......... 386/241–242; 348/231.99, 239

See application file for complete search history.

(56) References Cited

U.S. PATENT DOCUMENTS

| 6,762,791 | B1 * | 7/2004 | Schuetzle | 348/231.3 |
| 2002/0016971 | A1 * | 2/2002 | Berezowski et al. | 725/105 |
| 2008/0180549 | A1 * | 7/2008 | Lee et al. | 348/231.2 |

FOREIGN PATENT DOCUMENTS

JP 2005-020484 1/2005

\* cited by examiner

*Primary Examiner* — Sinh Tran
*Assistant Examiner* — Mark Monk
(74) *Attorney, Agent, or Firm* — Cowan, Liebowitz & Latman, P.C.

(57) ABSTRACT

An image capturing apparatus is able to record a moving image in a first image capturing mode or a second image capturing mode. In the first image capturing mode, the apparatus starts recording of a moving image signal in response to an instruction to start recording and stops recording of the moving image signal in response to an instruction to stop recording. In the second image capturing mode, the apparatus starts recording of a moving image signal in response to the instruction to start recording, and automatically stops recording of the moving image signal when a predetermined period elapses after recording of the moving image signal starts. The apparatus controls so as to extract a moving image signal of the predetermined period from a moving image signal recorded in the first image capturing mode on a recording medium, and to record the extracted moving image signal on a recording medium.

16 Claims, 9 Drawing Sheets

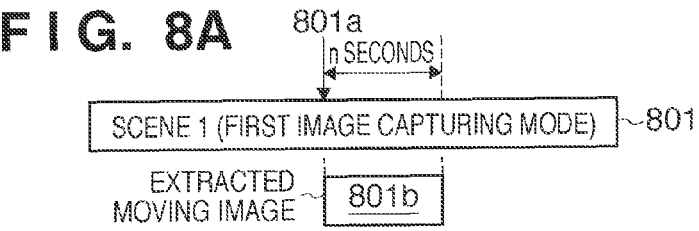
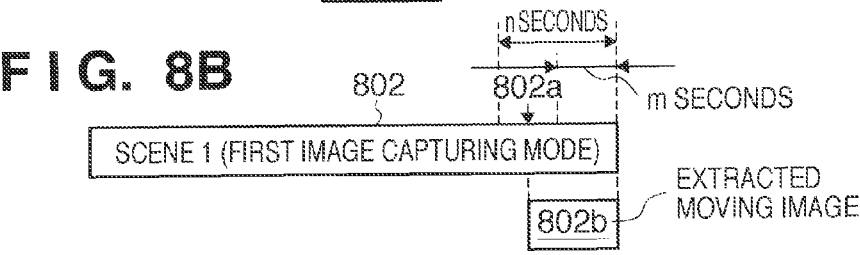
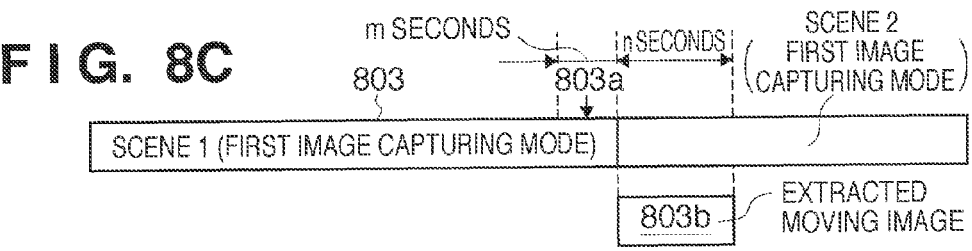
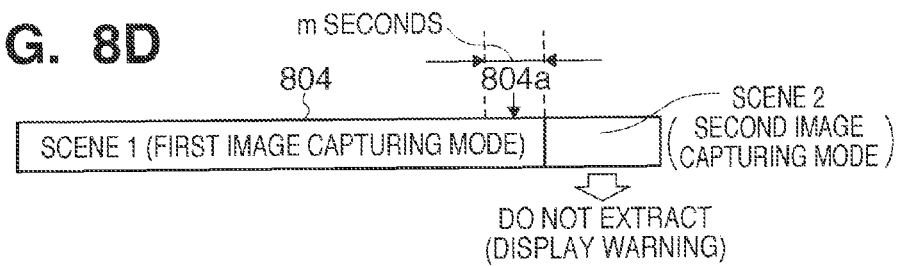
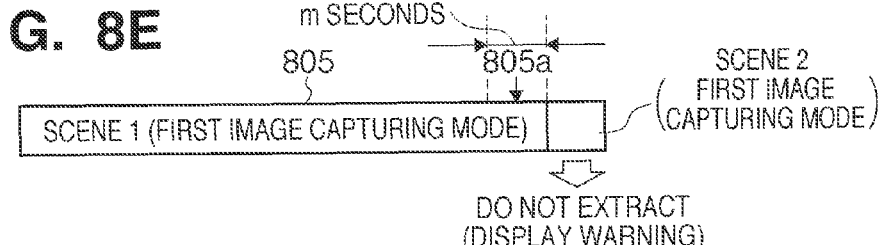
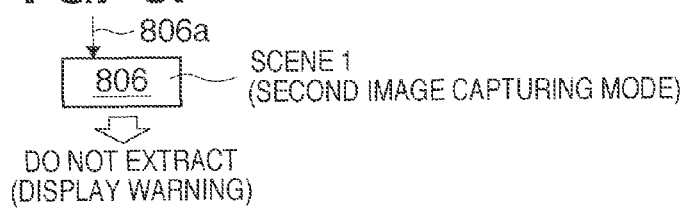

IMAGE CAPTURING APPARATUS AND CONTROL METHOD THEREOF

BACKGROUND OF THE INVENTION

1. Field of the Invention

The present invention relates to an image capturing apparatus.

2. Description of the Related Art

Video cameras that capture moving images and record the captured images on a memory card or a disk medium are already known. Normally, a video camera starts to capture and record moving images in response to an instruction to start capturing images from a photographer, and the video camera stops recording in response to an instruction to stop capturing images from the photographer.

In addition to this type of normal image capturing function, a function has also been proposed that automatically stops capturing images a predetermined time period after an instruction to start capturing images (for example, see Japanese Patent Laid-Open No. 2005-20484).

Similarly, a function has also been proposed that, when capturing images, automatically stops recording after a predetermined time period has elapsed from the start of image capturing.

However, when a user wants to select and extract a moving image captured in the aforementioned predetermined time period from among moving images that have already been recorded, the user must designate the beginning and end positions of the moving image for the predetermined time period, and thus the usability is poor.

SUMMARY OF THE INVENTION

According to one embodiment of the present invention, an apparatus is provided that can solve the above problem by easily extracting a moving image of a predetermined time period from among recorded moving images.

According to one aspect of the present invention, there is provided an image capturing apparatus, comprising: an imaging unit; an input unit configured to receive an instruction to start recording and an instruction to stop recording; a recording unit configured to record a moving image signal obtained by the imaging unit on a recording medium, wherein the recording unit starts recording of the moving image signal in response to the instruction to start recording and stops recording of the moving image signal in response to the instruction to stop recording in a first image capturing mode, and starts recording of the moving image signal in response to the instruction to start recording and automatically stops recording of the moving image signal a predetermined period after recording of the moving image signal starts in a second image capturing mode; and a control unit configured to control the recording unit so as to extract a moving image signal of the predetermined period from a moving image signal that has been recorded on the recording medium in the first image capturing mode, and record the extracted moving image signal on the recording medium.

Also, according to another aspect of the present invention, there is provided a control method of an image capturing apparatus comprising imaging unit, and a recording unit configured to record a moving image signal obtained by the imaging unit on a recording medium, the method comprising: input steps of receiving an instruction to start recording and an instruction to stop recording; a recording step of actuating the recording unit in an image capturing mode selected from a plurality of image capturing modes including a first image capturing mode where the recording unit starts recording of the moving image signal in response to the instruction to start recording and stops recording of the moving image signal in response to the instruction to stop recording, and a second image capturing mode where the recording unit starts recording of the moving image signal in response to the instruction to start recording and automatically stops recording of the moving image signal a predetermined period after recording of the moving image signal starts; and a control step of controlling the recording unit so as to extract a moving image signal of the predetermined period from a moving image signal that has been recorded on the recording medium in the first image capturing mode, and record the extracted moving image signal on the recording medium.

Further features of the present invention will become apparent from the following description of exemplary embodiments with reference to the attached drawings.

BRIEF DESCRIPTION OF THE DRAWINGS

FIG. 8A to FIG. 8F are views that describe extraction processing in accordance with extraction positions.

DESCRIPTION OF THE EMBODIMENTS

Figure 1:
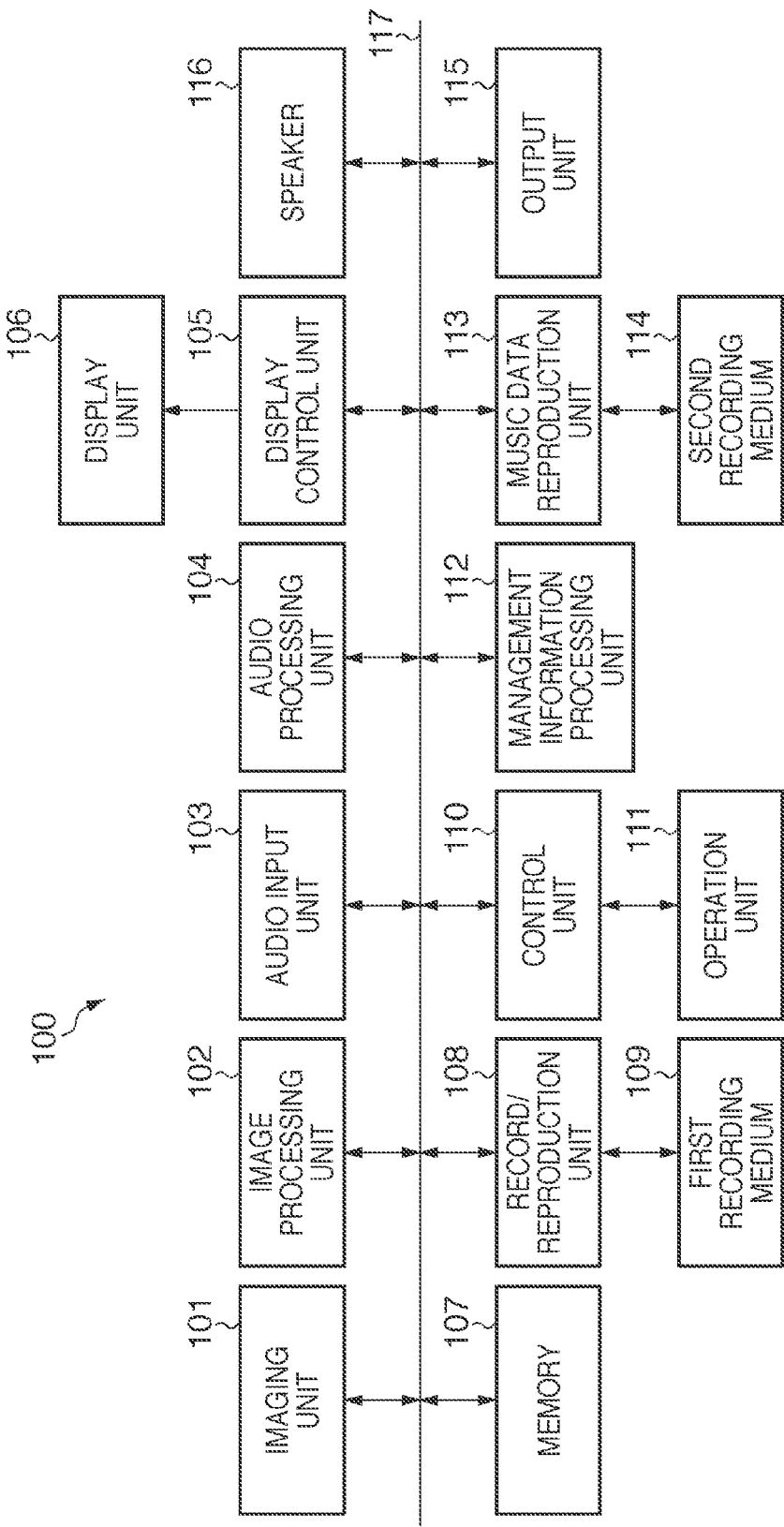
FIG. 1 is a block diagram that illustrates the configuration of an image capturing apparatus according to one embodiment.

FIG. 1 is a view that illustrates the configuration of an image capturing apparatus 100 to which the present invention is applied.

In FIG. 1, an imaging unit 101 includes a lens, an image pickup device, an image processing circuit and the like. The imaging unit 101 captures images of a subject and outputs a moving image signal. At the time of recording, an image processing unit 102 executes known encoding processing such as MPEG (Moving Picture Expert Group) encoding with respect to a moving image signal that is output from the imaging unit 101 to compress the information amount thereof. The image processing unit 102 also decodes a moving image signal that is reproduced at a reproduction time. An audio input unit 103 includes a microphone and a processing circuit that executes necessary processing with respect to an audio signal acquired by the microphone, and outputs an audio signal obtained during image capturing. An audio processing unit 104 executes known encoding processing such as MP3 (MPEG audio layer 3) encoding on an audio signal that is input at a time of image capturing, and compresses the information amount thereof. The audio processing unit 104 also decodes audio signals that are reproduced from a first recording medium 109 or music data reproduced from a second recording medium 114 at a time of reproduction. A display control unit 105 displays various kinds of information such as captured moving images or reproduced moving images on a display unit 106. The display unit 106 includes a liquid crystal panel or the like. A memory 107 stores moving image signals and audio signals, and also stores various information required for recording and reproduction.

When recording, a record/reproduction unit 108 records moving image signals and audio signals on a first recording medium 109 and also records management information from a management information processing unit 112. Further, when reproducing, the record/reproduction unit 108 reproduces moving image signals and audio signals from the first recording medium 109 as well as management information and the like. The first recording medium 109 is a recording medium such as a memory card or a hard disk, and in particular is a random-access recording medium. Although according to the present embodiment the first recording medium 109 is assumed to be a recording medium that is built into the image capturing apparatus 100, the first recording medium 109 can also be a replaceable recording medium. A control unit 110 includes a microcomputer that operates in accordance with a program stored in a non-volatile memory (not shown) and controls each component of the image capturing apparatus 100 in accordance with an instruction from an operation unit 111. The operation unit 111 includes a power switch, a switch for instructing the image capturing apparatus 100 to start or stop recording, a switch for switching to a reproduction mode, a switch for displaying a menu, and the like. By operating the operation unit 111, as described later, a user can instruct the image capturing apparatus 100 to start or stop image capturing, or to switch between an image capturing mode and a reproduction mode.

When the image capturing apparatus 100 is capturing images, the management information processing unit 112 generates various kinds of management information including information regarding the image capturing mode of moving image signals that are being recorded, and sends the management information to the record/reproduction unit 108. When reproducing moving images, the management information processing unit 112 detects various kinds of information included in the reproduced management information, and sends the information to the control unit 110. A music data reproduction unit 113 reproduces music data that is recorded on the second recording medium 114. According to the present embodiment, as described above, when reproducing moving images, music that is recorded on the second recording medium 114 can be output instead of the audio data that is recorded at the time of image capturing. The second recording medium 114 is a replaceable recording medium such as a memory card. It is assumed that music data including a plurality of songs is previously recorded on the second recording medium 114. An output unit 115 outputs reproduced moving images or audio signals to an external device. A speaker 116 outputs reproduced audio signals. A data bus 117 transmits various kinds of data between the respective components.

Next, image capturing and recording processing according to the present embodiment is described.

The image capturing apparatus 100 of the present embodiment has a first image capturing mode where the image capturing apparatus 100 starts recording a moving image in response to an instruction to start recording from a user, and stops recording the moving image in response to a user instruction to stop recording. Further, according to the present embodiment, the image capturing apparatus 100 has a second image capturing mode where the image capturing apparatus 100 starts recording a moving image in response to an instruction to start recording, and automatically stops recording the moving image after a predetermined period elapses from the start of recording. The user can operate the operation unit 111 to arbitrarily set either of these two recording modes. The image capturing apparatus 100 operates in either the first or second image capturing mode in accordance with the setting made by the user.

Figure 2:
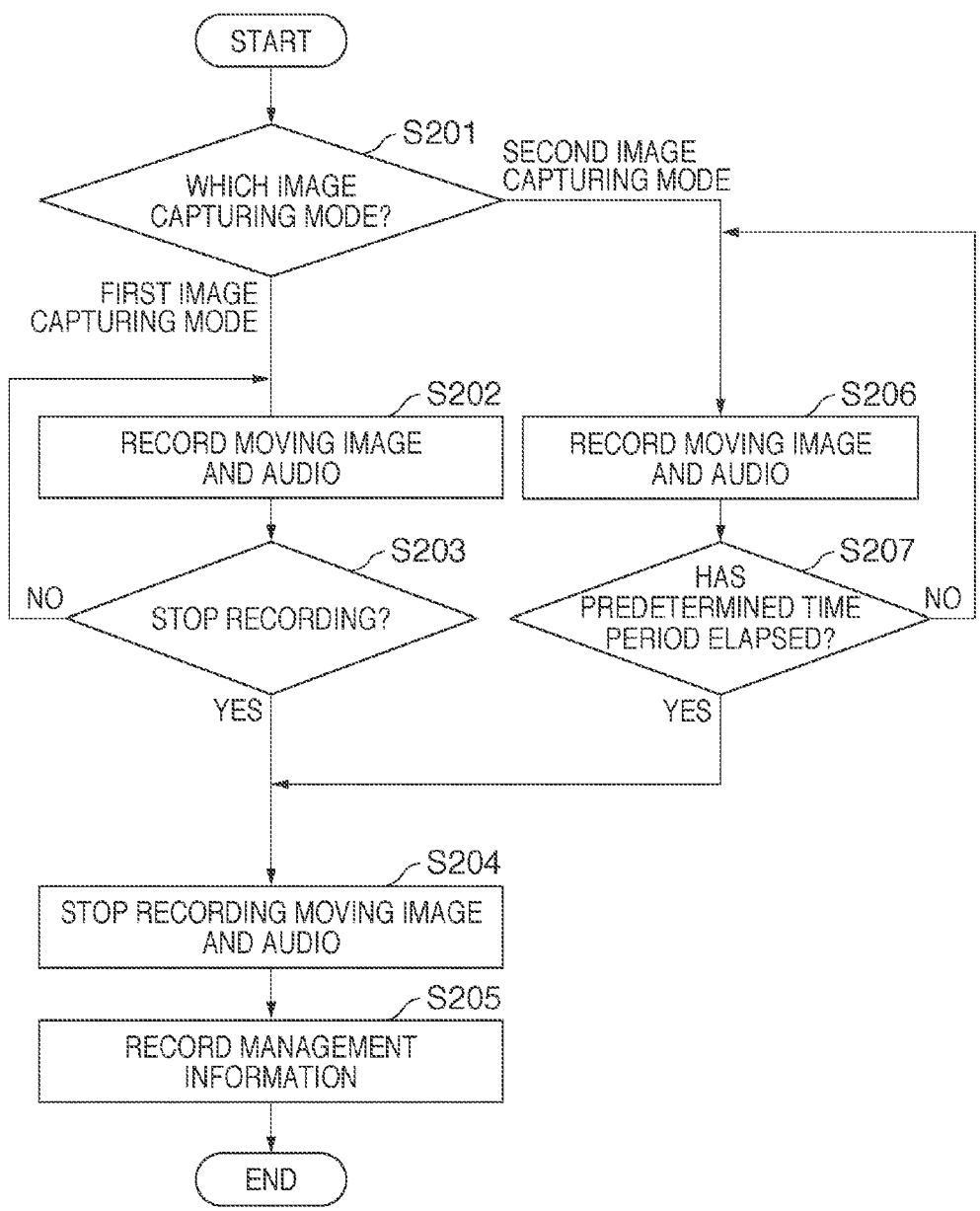
FIG. 2 is a flowchart that illustrates processing in an image capturing mode.

FIG. 2 is a flowchart that illustrates processing in an image capturing mode. When a user turns on the power of the image capturing apparatus 100 or switches to the image capturing mode using the operation unit 111, a moving image signal is output by the imaging unit 101 and an image of a subject that is imaged is displayed on the display unit 106. If an instruction to start image capturing is received from the operation unit 111 in this state, the processing flow shown in FIG. 2 starts. The processing shown in FIG. 2 is executed by the control unit 110 controlling the respective components of the image capturing apparatus 100.

First, the control unit 110 determines whether the set image capturing mode is the first or the second image capturing mode (S201). If the first image capturing mode has been set, the control unit 110 starts to record a moving image and audio (S202). More specifically, under control of the control unit 110, the image processing unit 102 starts processing to encode the moving image signal, and outputs the encoded moving image signal to the record/reproduction unit 108. Further, the audio processing unit 104 starts processing to encode the audio signal, and outputs the encoded audio signal to the record/reproduction unit 108. The record/reproduction unit 108 multiplexes the encoded moving image signal and audio signal according to the recording format of the first recording medium 109, and records the resulting signal on the first recording medium in response to the instruction to start image capturing.

After starting recording in this manner, the control unit 110 detects whether or not the user has input an instruction to stop recording (S203). If the user has input an instruction to stop recording, the control unit 110 stops the processing to encode the moving image signal by the image processing unit 102 and the processing to encode the audio signal by the audio processing unit 104, and stops recording of the moving images and audio on the first recording medium 109 (S204). According to the present embodiment, moving images and audio for a series of scenes from when recording starts to when recording stops are recorded as a moving image file on the first recording medium 109. The management information processing unit 112 generates management information including information that indicates the image capturing mode of the recorded moving image file and the recording time (length) of the recorded moving image file, and outputs the management information to the record/reproduction unit 108. In this case, information that indicates the first image capturing mode is generated as the information regarding the image capturing mode. The record/reproduction unit 108 records this management information regarding the first recording medium 109 in correspondence with the moving image file (S205).

Further, if the second image capturing mode is set in S201, similarly to S202, the control unit 110 starts to record the moving images and audio (S206). At the same time as starting recording, the control unit 110 starts to measure an elapsed time period from the start of recording by means of an in-built counter. When a predetermined period (for example, n seconds (n is a positive number greater than or equal to 1) elapses after recording starts (S207), the control unit 110 automatically stops recording the moving images and audio (S204). Next, the control unit 110 records management information on the first recording medium 109 (S205). In this case, the information regarding the image capturing mode contained in the management information is information that indicates the second image capturing mode.

According to the present embodiment, moving images and audio that are recorded in accordance with a single recording instruction are recorded as a single moving image file. Further, management information is recorded as a management information file that is separate to the moving image file.

Next, processing in a reproduction mode is described.

According to the present embodiment, the image capturing apparatus 100 has a first reproduction mode where the image capturing apparatus 100 reproduces a plurality of moving image files that have been recorded on the first recording medium 109, in the order in which the moving image files are recorded. In the first reproduction mode, moving image files that were recorded in either the first image capturing mode or the second image capturing mode are reproduced in the order in which the moving image files were recorded. Further, in the first reproduction mode, as described later, files of extracted moving images that have been extracted from a moving image recorded in the first image capturing mode and recorded are also reproduced in the recorded order. According to the present embodiment, the image capturing apparatus 100 also has a second reproduction mode where the image capturing apparatus 100 selects moving image files that are recorded in the second image capturing mode and extracted moving image files from among the moving image files recorded on the first recording medium 109, and reproduces the selected files in the order in which they have been recorded. By operating the operation unit 111, a user can switch between the first reproduction mode and the second reproduction mode.

Figure 3:
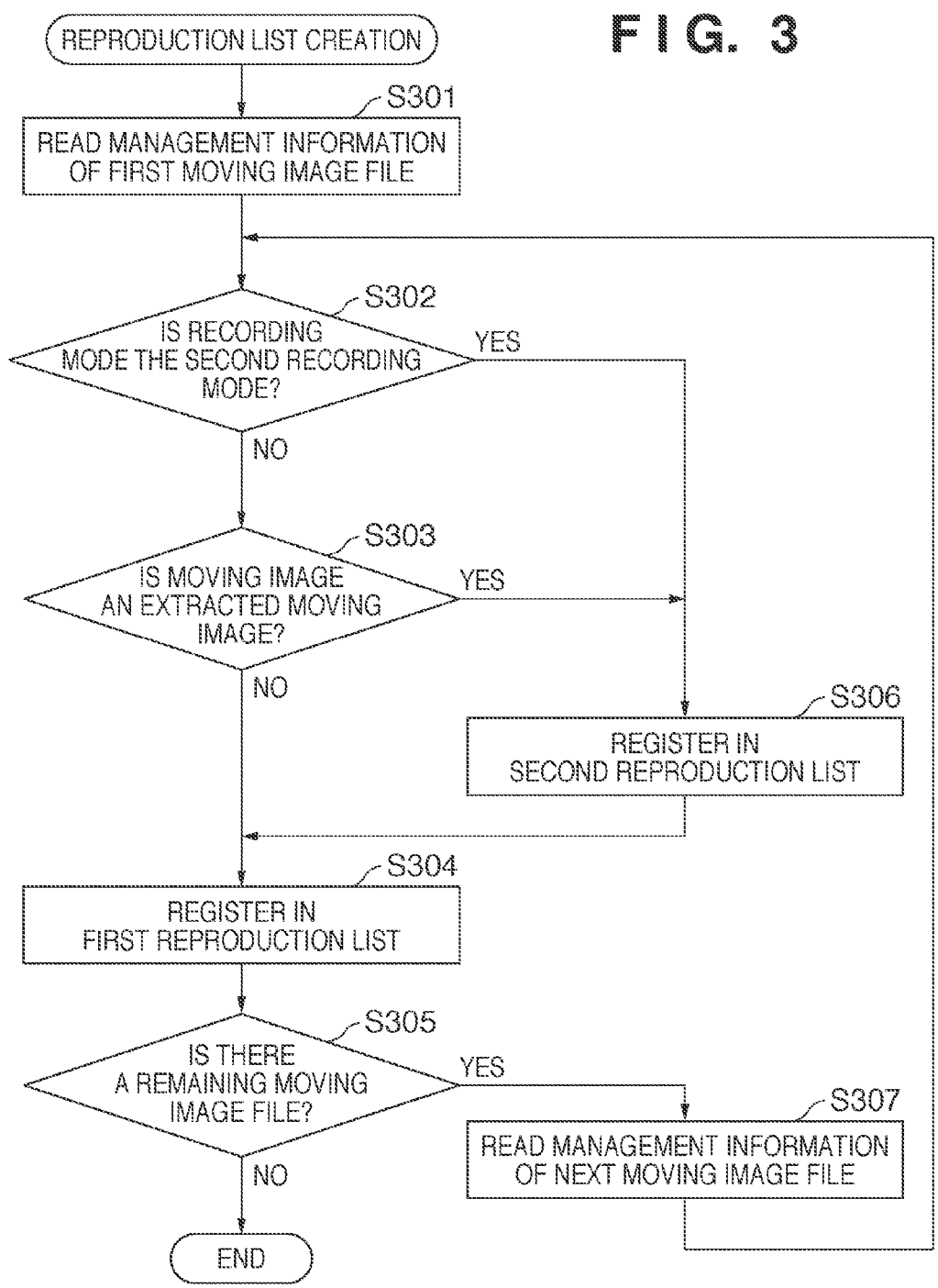
FIG. 3 is a flowchart that illustrates processing to generate a reproduction list.

First, processing that generates a reproduction list that shows the reproduction order of moving image files that are reproduced in the first reproduction mode and the second reproduction mode is described. FIG. 3 is a flowchart that illustrates processing to generate a reproduction list. The processing shown in FIG. 3 is executed by the control unit 110 controlling each component of the image capturing apparatus 100. Although it is assumed that the processing shown in FIG. 3 is executed when the user switches the image capturing apparatus 100 to the reproduction mode, naturally the processing of FIG. 3 may also be executed at a timing other than when switching to the reproduction mode.

First, under control of the control unit 110, the record/reproduction unit 108 reads out management information of the first moving image file among management information that is recorded on the first recording medium 109 (S301). The control unit 110 detects the image capturing mode of the moving image file based on the management information, and determines whether or not the moving image file has been recorded in the second image capturing mode (S302). If the moving image file has been recorded in the second image capturing mode, the control unit 110 registers identification information (for example, a file name or file number) that identifies the relevant moving image file in a second reproduction list (S306). The control unit 110 also registers the relevant moving image file in a first reproduction list (S304). According to the present embodiment, it is assumed that a first reproduction list and a second reproduction list that have already been created are stored in the memory 107. When reproduction lists are not stored in the memory 107, reproduction lists are newly generated and the relevant identification information is stored in the memory 107. If reproduction lists have already been created in the memory 107, the corresponding identification information is newly added to the first and second reproduction lists.

Next, the control unit 110 determines whether or not there is a subsequent moving image file (S305). If there is a subsequent moving image file, the control unit 110 reads out the management information of the subsequent moving image file using the record/reproduction unit 108, and returns to S302 (S307).

If the result in S302 is that the image capturing mode is not the second image capturing mode, the control unit 110 determines whether or not the moving image file is a moving image file (extracted moving image file) that has been recorded by extraction processing that is described later (S303). According to the present embodiment, in addition to information regarding the image capturing mode, the management information also includes information showing whether the relevant moving image file has been recorded by extraction processing. Therefore, the control unit 110 determines whether or not the moving image file is an extracted moving image file based on the management information. When the moving image file is an extracted moving image file, the moving image file is registered in the second reproduction list (S306).

If the result obtained in S303 is that the moving image file is not an extracted file, the control unit 110 determines that the relevant moving image file has been recorded in the first image capturing mode, and registers the moving image file in the first reproduction list (S304). Next, the control unit 110 determines if there is a subsequent moving image file (S305). If there is a subsequent moving image file, the control unit 110 reads out the management information of the subsequent moving image file and returns to S302 (S307).

Figure 4:
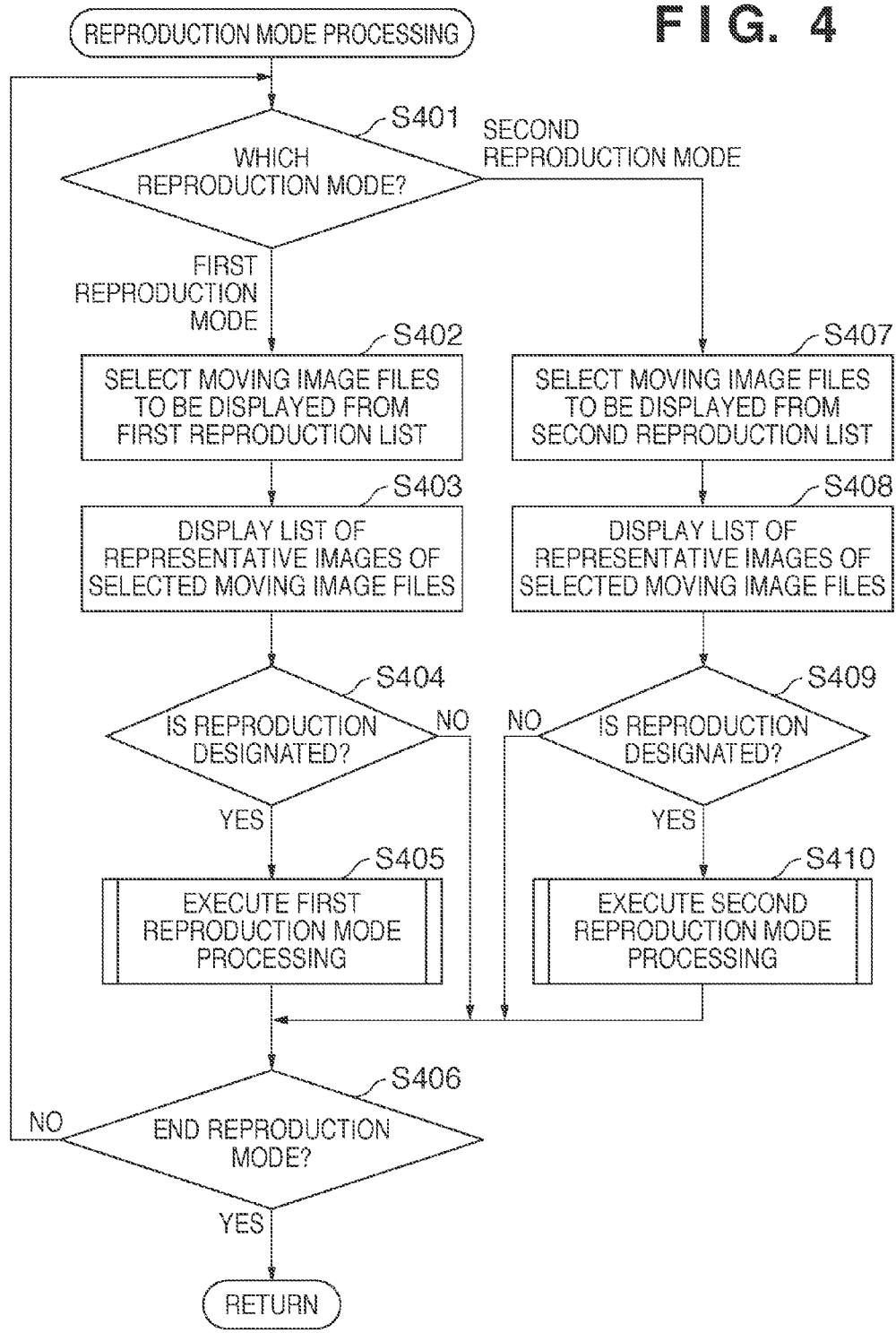
FIG. 4 is a flowchart that illustrates reproduction mode processing.

FIG. 4 is a flowchart that illustrates processing executed in the reproduction mode. The processing shown in FIG. 4 is executed by the control unit 110 controlling the respective components of the image capturing apparatus 100 when the image capturing apparatus 100 is switched to the reproduction mode. According to the present embodiment, when the image capturing apparatus enters the reproduction mode, an index screen including representative images of a plurality of moving image files recorded on the first recording medium 109 is displayed on the display unit 106. A user can input an instruction to select and reproduce a desired moving image from among the representative images displayed on the display unit 106.

First, the control unit 110 determines the reproduction mode that has been set by the user (S401). If the first reproduction mode has been set, the control unit 110 selects moving image files to be displayed on the index screen from the first reproduction list that has been stored in the memory 107 (S402). According to the present embodiment, it is assumed that a predetermined number of representative images, for example, six representative images are displayed on a single index screen. In this case, the first six moving image files from the start are selected from among the moving image files registered in the first reproduction list. The control unit 110 displays the index screen including the representative images of the moving image files that are selected on the display unit 106 (S403). More specifically, under control of the control unit 110, the record/reproduction unit 108 reproduces and decodes the first frame of each moving image file that is selected, and sends the first frames to the display control unit 105. The display control unit 105 generates representative images by reducing the size of the first frame of each moving image file, and displays the representative images on the display unit 106. By operating the operation unit 111, the user can appropriately switch the representative images that are displayed on the display unit 106.

The user uses the operation unit 111 to select a desired moving image from the plurality of representative images included in the index screen displayed on the display unit 106 in this manner and input a reproduction instruction (S404). When reproduction is instructed, the control unit 110 executes processing in the first reproduction mode (S405). Subsequently, the control unit 110 ends the processing when the user inputs an instruction to end the reproduction mode (S406).

If it is determined in S401 that the second reproduction mode has been set, the control unit 110 selects moving image files to be displayed on the index screen from the second reproduction list stored in the memory 107 (S407). In this case, the first six moving image files from the start are selected from the moving image files registered in the second reproduction list. The control unit 110 displays the index screen including representative images of the selected moving image files on the display unit 106 (S408). More specifically, under control of the control unit 110, the record/reproduction unit 108 reproduces and decodes the first frame of each moving image file that is selected, and sends the first frames to the display control unit 105. The display control unit 105 generates representative images by reducing the size of the first frame of each moving image file, and displays the representative images on the display unit 106. By operating the operation unit 111, the user can appropriately switch the representative images that are displayed on the display unit 106.

The user uses the operation unit 111 to select a desired moving image from the plurality of representative images included in the index screen displayed on the display unit 106 in this manner and input a reproduction instruction (S409). When reproduction is instructed, the control unit 110 executes processing in the second reproduction mode (S410). Subsequently, the control unit 110 ends the processing when the user inputs an instruction to end the reproduction mode (S406).

Figure 5:
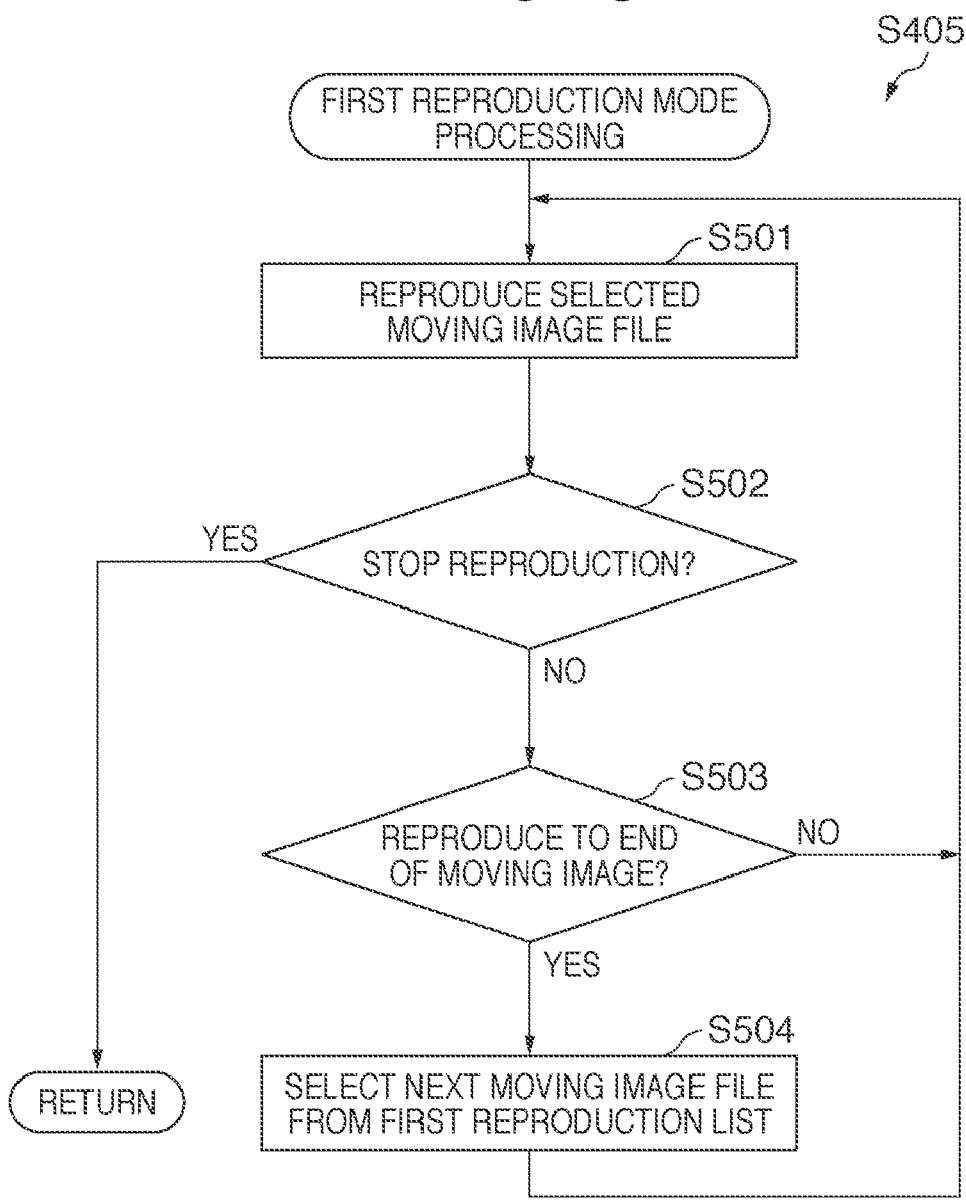
FIG. 5 is a flowchart that illustrates processing in a first reproduction mode.

Next, the first reproduction mode processing in S405 is described. FIG. 5 is a flowchart that illustrates the first reproduction mode processing.

When the start of reproduction is instructed in S404 in FIG. 4, under control of the control unit 110, the record/reproduction unit 108 reproduces from the first recording medium 109 a moving image file that corresponds to the representative image that is selected on the index screen (S501). The record/reproduction unit 108 separates a moving image signal from the reproduced moving image file and sends the moving image signal to the image processing unit 102, and also separates an audio signal from the reproduced moving image file and sends the audio signal to the audio processing unit 104. The image processing unit 102 decodes the reproduced moving image signal and sends the decoded moving image signal to the display control unit 105 to display the reproduced moving image on the display unit 106. The audio processing unit 104 decodes the reproduced audio signal, and sends the decoded audio signal to the speaker 116 to output sound. The control unit 110 determines whether or not the user has input an instruction to stop reproduction by operating the operation unit 111, and if an instruction to stop reproduction has been input, the control unit 110 stops reproduction of the moving image file (S502).

If the control unit 110 determines that the user has not input an instruction to stop reproduction and that the moving image file that is currently being reproduced is to be reproduced to the end (S503), the control unit 110 selects the next moving image file from the first reproduction list and returns to S501 to reproduce the next moving image file (S504). Thus, the moving image files registered in the first reproduction list are successively reproduced in sequence. When reproduction of moving image files to the end of the first reproduction list is completed (i.e. there is no subsequent moving image file in the first reproduction list), the control unit 110 ends the reproduction processing.

Figure 6:
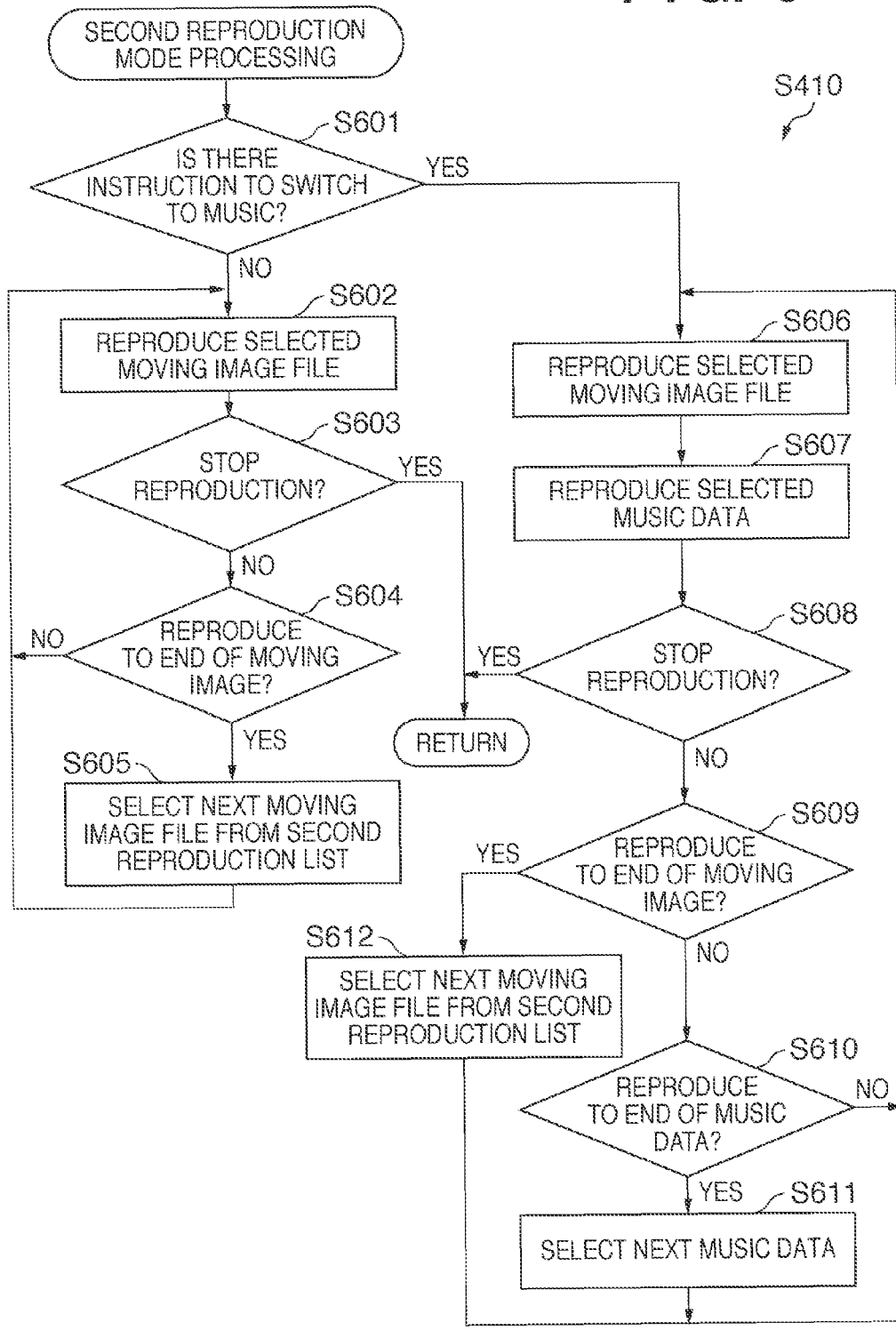
FIG. 6 is a flowchart that illustrates processing in a second reproduction mode.

Next, the second reproduction mode processing in S410 is described. FIG. 6 is a flowchart that illustrates the second reproduction mode processing. As described above, in the second reproduction mode, moving images of a predetermined time period that are captured in the second image capturing mode and moving images of a predetermined time period that have been extracted from moving images that are recorded in the first image capturing mode are successively reproduced. According to the present embodiment, when reproducing moving images of a predetermined time period successively in this manner, music recorded on the second recording medium 114 can be output as background music (BGM) instead of the audio that is recorded at the time of image capturing.

More specifically, in FIG. 6, the control unit 110 detects a user operation at the operation unit 111, and determines whether or not the user has input an instruction to switch to music at the time of reproduction as described above (S601). When there is no instruction to switch to music, under the control of the control unit 110, the record/reproduction unit 108 reproduces from the first recording medium 109 a moving image file that corresponds to the representative image that is selected on the index screen (S602). A moving image is displayed on the display unit 106 based on a moving image signal from the reproduced moving image file, and audio based on an audio signal of the reproduced moving image file is output from the speaker 116. This processing is the same as the processing described above in relation to the aforementioned S501. Subsequently, the control unit 110 determines whether or not the user has input an instruction to stop reproduction, and if an instruction to stop reproduction has been input the control unit 110 stops reproduction of the moving image file (S603).

If an instruction to stop reproduction has not been input, and the moving image file that is currently being reproduced is to be reproduced to the end (S604), the control unit 110 selects the next moving image file from the second reproduction list and returns to S602 to reproduce the next moving image file (S605). When reproduction of moving image files to the end of the second reproduction list is completed (i.e. there is no subsequent moving image file in the second reproduction list), the control unit 110 ends the reproduction processing.

If the user has input an instruction to switch to music in S601, the record/reproduction unit 108 reproduces from the first recording medium 109 a moving image file that corresponds to the representative image that is selected on the index screen (S606). Further, the music data reproduction unit 113 selects any music data among the music data recorded on the second recording medium 114, and reproduces the selected music data (S607). In this connection, although it is assumed that the music data is reproduced in a predetermined order at this time, a configuration may also be adopted in which the user designates the music data to be reproduced.

The image processing unit 102 decodes the moving image signal included in the moving image file that is reproduced and displays a moving image on the display unit 106. In this case, the audio signal of the reproduced moving image file is not sent to the audio processing unit 104. Instead, music data that is reproduced by the music data reproduction unit 113 is sent to the audio processing unit 104. The audio processing unit 104 decodes the music data that has been reproduced from the second recording medium 114, and sends the decoded music data to the speaker 116. Thus, music that has been reproduced from the second recording medium 114 is output as background music instead of the audio that is recorded when the moving images are captured.

Next, the control unit 110 determines whether or not an instruction to stop reproduction has been input, and if an instruction to stop reproduction has been input the control unit 110 stops reproduction of the moving image file (S608). If an instruction to stop reproduction has not been input, the control unit 110 determines whether or not the moving image file that is currently being reproduced has been reproduced to the end (S609). If the moving image file that is currently being reproduced has been reproduced to the end, the control unit 110 selects the next moving image file from the second reproduction list, and returns to S606 to reproduce the thus-selected next moving image file (S612). When reproduction of moving image files is completed to the end of the second reproduction list (i.e. there is no subsequent moving image file in the second reproduction list), the control unit 110 ends the reproduction processing.

When the moving image file that is currently being reproduced has not been reproduced to the end, the control unit 110 determines whether or not the music data that is being reproduced from the second recording medium 114 has been reproduced to the end (S610). If the music data has been reproduced to the end, the control unit 110 reproduces the next music data from the second recording medium 114 and outputs the music data as background music (S611).

Thus, in the second reproduction mode, when the user inputs an instruction to switch to music, music that is different to the audio recorded at the time of image capturing is output as background music while successively displaying moving images of different scenes every n seconds. At this time, although the scenes of the moving images are switched every n seconds, the music used as the background music is reproduced continuously regardless of the length of each scene.

According to the present embodiment, it is assumed that when the user inputs an instruction to switch to music, the music data that is reproduced from the second recording medium 114 is encoded. However, a case may also be considered in which music data recorded on the second recording medium 114 is not encoded. In such case, a configuration may be adopted so that the reproduced music data is output to the output unit 115, and instead of audio data from the audio processing unit 104, the output unit 115 outputs the music data from the second recording medium 114 from the speaker 116.

Next, extraction processing with respect to a moving image is described. The term "extraction processing" refers to processing that automatically extracts a moving image of a time period of n seconds that starts from a time point that is arbitrarily designated by a user from a moving image recorded in the first image capturing mode, and records the extracted moving image as a separate moving image file on the first recording medium 109. That is, according to extraction processing, a moving image of the same duration as a recording time in the second image capturing mode is automatically extracted from a moving image recorded in the first image capturing mode, and is recorded as a separate moving image file.

Figure 7A:
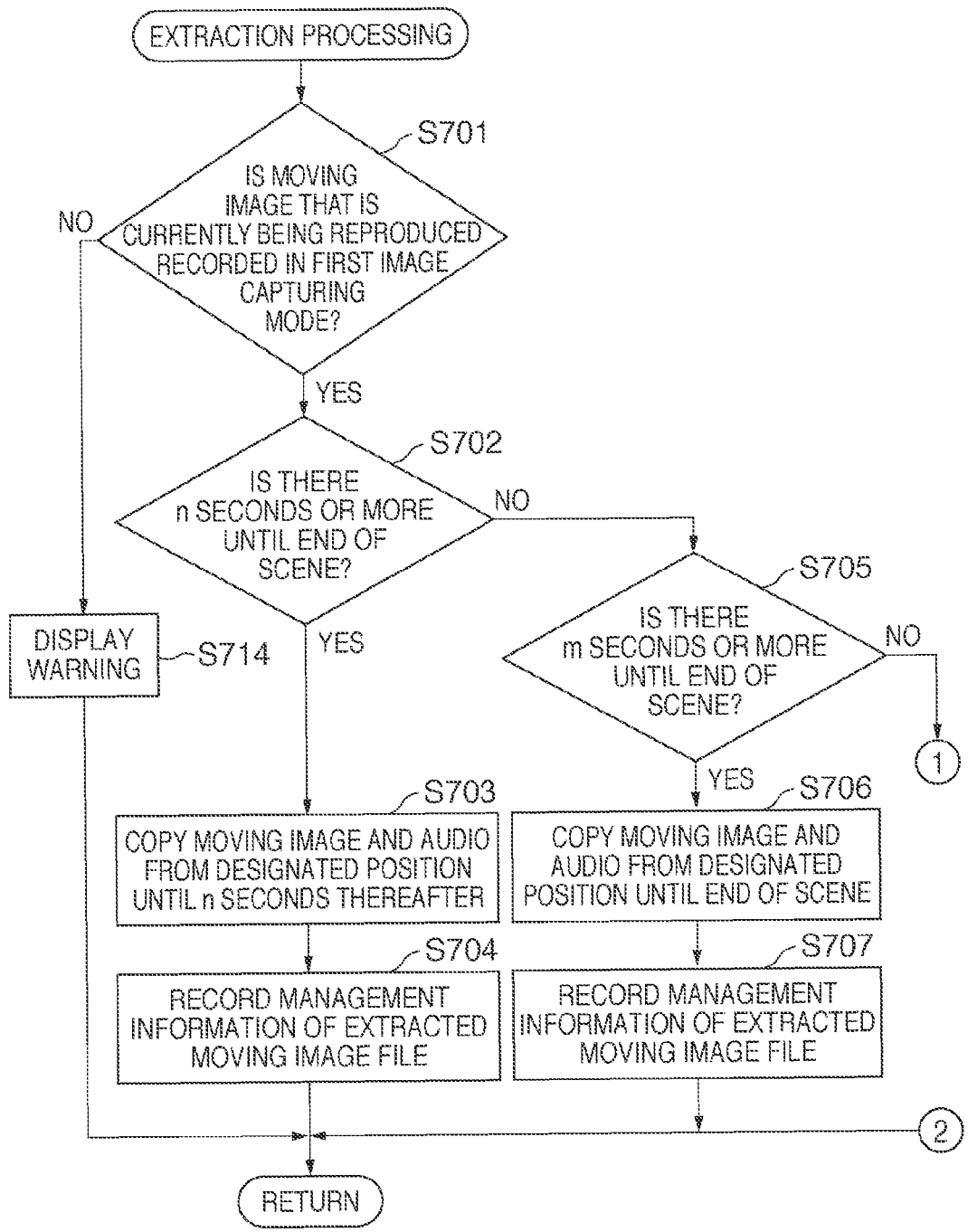
FIG. 7A and FIG. 7B are a flowchart that illustrates extraction processing.
Figure 7B:
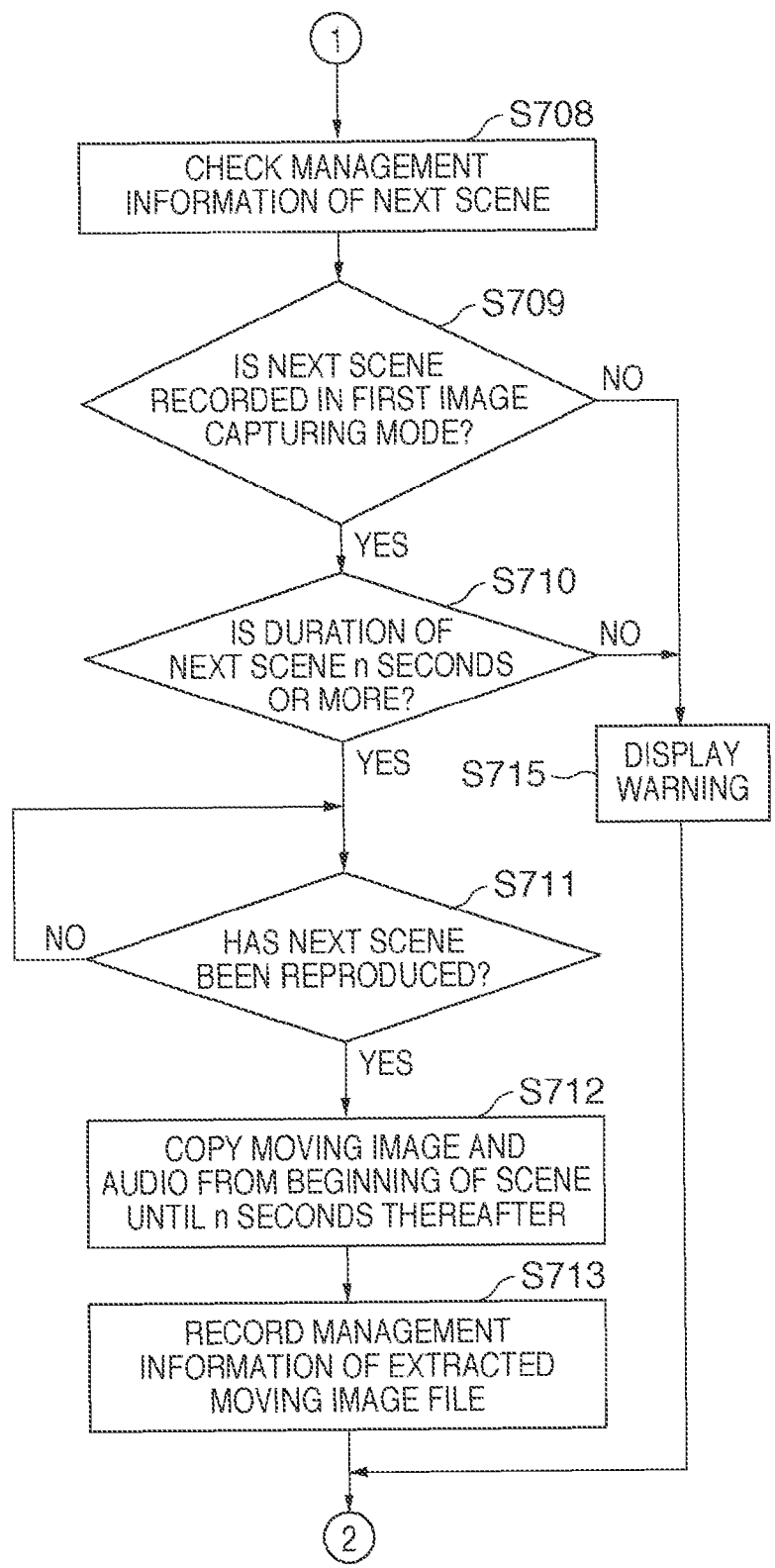

FIGS. 7A and 7B are a flowchart that illustrates the extraction processing. The processing shown in FIGS. 7A and 7B starts when a user designates an extraction start position by operating the operation unit 111 at a timing at which an image at the extraction start position is reproduced during reproduction of a moving image in the first reproduction mode shown in FIG. 5. More specifically, when the user causes the image capturing apparatus 100 to reproduce a moving image in the first reproduction mode and is checking the reproduced moving image on the display unit 106, the user designates an extraction start position by operating a trigger switch that is used for instructing starting and stopping of image capturing. In this way, the user can input an instruction for an extraction start position of a moving image as an instruction for capturing images in the second image capturing mode. In this connection, the control unit 110 is configured not to accept an instruction to start extraction in the second reproduction mode.

When an extraction start position is designated, based on information regarding the recording time period that is described in the management information, the control unit 110 determines whether the moving image file that is currently being reproduced is a file that has been recorded in the first image capturing mode (S701). When the moving image file that is currently being reproduced is a file other than a moving image file recorded in the first image capturing mode, that is, when the file is a moving image file recorded in the second image capturing mode or a moving image file recorded by extraction processing, the control unit 110 displays information showing that extraction can not be performed on the display unit 106 (S714). The control unit 110 then ends the extraction processing and continues reproduction of the moving image in the first reproduction mode.

If the moving image file that is currently being reproduced is a file that has been recorded in the first image capturing mode, the control unit 110 determines whether or not a period from the designated extraction start position to the end of the scene being reproduced is greater than or equal to a predetermined period, in this case, n seconds (S702). If the period from the extraction start position to the end of the scene is greater than or equal to n seconds, the control unit 110 records (copies) a moving image and audio of a period of n seconds starting from the designated extraction start position from the moving image file that is being reproduced, and stores the thus-recorded moving image and audio of the time period of n seconds as a separate moving image file on the first recording medium 109 (S703). More specifically, after reproducing and decoding a moving image signal and an audio signal from the designated position, the control unit 110 temporarily stores the moving image signal and audio signal in the memory 107. Thereafter, the image processing unit 102 and the audio processing unit 104 read out the moving image signal and the audio signal from the memory 107, respectively, and encode the signals that are read out. Next, the record/reproduction unit 108 records the encoded moving image signal and audio signal as an extracted moving image file on the first recording medium 109. At this time, if the capacity of the memory 107 is insufficient to store the moving image signal and audio signal of a period of n seconds, the control unit 110 may repeat processing that reproduces and decodes a moving image signal and audio signal of an amount that can be stored in the memory 107, and again encodes the moving image signal and audio signal and records the encoded moving image signal and audio signal on the first recording medium 109.

When recording of the extracted moving image file ends, the management information processing unit 112 adds information indicating that the newly recorded moving image file is an extracted moving image file to the management information, and records the information regarding the first recording medium 109 (S704). And, when recording of the extracted moving image file ends, the control unit 110 adds an identification information of the newly recorded extracted moving image file to the second reproduction list stored in the memory 107.

In S702, if the time period from the designated extraction start position to the end of the scene is shorter than n seconds, the control unit 110 further determines whether or not the time period to the end of the scene is greater than or equal to m seconds (m<n, and m is a predetermined value greater than 0) (S705). The processing in S705 is processing for determining whether or not the designated extraction start position is immediately before the end of the scene that is being reproduced, and m is a threshold value used to perform this determination. Therefore, it is desirable that the value of m is greater than 0 and is roughly a value between 0 and 1.

If there is a time period of m seconds or more until the end of the scene, the control unit 110 records the moving image signal and audio signal from the designated extraction start position to the end of the scene on the first recording medium 109 as a separate moving image file (S706). At this time, the length of the moving image and audio that is extracted and recorded is shorter than n seconds. When recording of the extracted moving image file ends, the management information processing unit 112 adds information indicating that the newly recorded moving image file is an extracted moving image file to the management information, and records the information regarding the first recording medium 109 (S707). And, when recording of the extracted moving image file ends, the control unit 110 adds an identification information of the newly recorded extracted moving image file to the second reproduction list stored in the memory 107.

In S705, if the time period from the extraction start position to the end of the scene is shorter than m seconds, that is, when the user has input an instruction to start extraction from a position that is immediately before the end of the scene, the control unit 110 detects the moving image to be reproduced next from among the moving image files registered in the first reproduction list. Subsequently, the control unit 110 checks the management information of the moving image file to be reproduced next (S708), and determines if the moving image file to be reproduced next is a moving image file that has been recorded in the first image capturing mode (S709). If the next scene has been recorded in the first image capturing mode, the control unit 110 detects the length (recording time) of the relevant next scene, and determines whether or not the length is greater than or equal to n seconds (S710). If the length of the next scene is greater than or equal to n seconds, the control unit 110 waits until the moving image file of the next scene is reproduced (S711). When the next scene is reproduced, the control unit 110 extracts a moving image signal and an audio signal of a time period of n seconds from the beginning of the next scene, and records the extracted moving image signal and audio signal on the first recording medium 109 as a separate moving image file (S712). When recording of the extracted moving image file is completed, the management information processing unit 112 adds information indicating that the newly recorded moving image file is an extracted moving image file to the management information, and records the information regarding the first recording medium 109 (S713). And, when recording of the extracted moving image file ends, the control unit 110 adds an identification information of the newly recorded extracted moving image file to the second reproduction list stored in the memory 107.

Further, in S709, if the moving image file to be reproduced next is not a moving image file that has been recorded in the first image capturing mode, or if, in S710, the length of the next scene is shorter than n seconds, the control unit 110 displays warning information showing that extraction can not be performed on the display unit 106. Thereafter, the control unit 110 ends the processing (S715).

The processing of S705 to S713 is processing that is based on the judgment that, when a user designates to start extraction at a boundary portion of a scene during reproduction of a moving image, the user wishes to extract a moving image and audio from the beginning of the next scene.

In this connection, reproduction of a moving image by the first reproduction mode is continued without change even while executing the processing shown in FIGS. 7A and 7B.

FIG. 8A to FIG. 8F include views that illustrate the manner in which extraction processing is performed when an extraction start position is designated.

In FIG. 8A, when an instruction is input to start extraction at a position 801a in scene 1 that is being reproduced, a moving image and audio for a time period of n seconds from the extraction start position is extracted and recorded as an extracted moving image file 801b. FIG. 8B illustrates a state when an instruction is input to start extraction at a position 802a in scene 1 that is being reproduced. Although a time period from the extraction start position 802a to the end of scene 1 is shorter than n seconds, because the time period is greater than or equal to m seconds, the control unit 110 extracts a moving image and audio from this extraction start position to the end of scene 1, and records the extracted moving image and audio as an extracted moving image file 802b. FIG. 8C illustrates a state when an instruction is input to start extraction at a position 803a in scene 1 that is being reproduced. Since a time period from the extraction start position 803a to the end of scene 1 is shorter than m seconds, and a reproduction time period of the subsequent scene 2 is also longer than n seconds, the control unit 110 extracts a moving image and audio of a time period of n seconds from the beginning of scene 2, and records the extracted moving image and audio as an extracted moving image file 803b.

FIG. 8D illustrates a state when an instruction is input to start extraction at a position 804a in scene 1 that is being reproduced. Since a time period from the extraction start position 804a to the end of scene 1 is shorter than m seconds and, further, the subsequent scene 2 has been recorded in the second image capturing mode, the control unit 110 displays a warning and prohibits extraction. FIG. 8E illustrates a state when an instruction is input to start extraction at a position 805a in scene 1 that is being reproduced. Although the time period from the extraction start position 805a to the end of scene 1 is shorter than m seconds and, further, the subsequent scene 2 is recorded in the first image capturing mode, the control unit 110 displays a warning and prohibits extraction because the recording time is shorter than n seconds. FIG. 8F illustrates a state when an instruction is input to start extraction at a position 806a during reproduction of scene 1 that has been recorded in the second image capturing mode. Since scene 2 is recorded in the second image capturing mode, the control unit 110 displays a warning and prohibits extraction.

Although according to the processing in FIGS. 7A and 7B, in S709 the extraction processing is not performed if the next scene has not been recorded in the first image capturing mode, for example, a configuration may be adopted that returns to S708 to check if the moving image file that is to be reproduced after the next scene in the first reproduction list has been recorded in the image capturing mode.

Further, according to the processing in FIGS. 7A and 7B, in S705, even if a time period from the designated extraction start position to the end of the scene is shorter than n seconds, unless the designated extraction start position is immediately before the end of the scene, a moving image and audio is extracted from the designated extraction start position until the end of the scene.

However, a configuration may also be adopted in which, in S702, when a time period from the designated extraction start position to the end of the scene is shorter than n seconds, the operation moves to the processing in S708 without performing extraction processing from the moving image file that is being reproduced.

Further, according to the present embodiment, the user designates the extraction start position when performing extraction processing by inputting an instruction at a timing at which the extraction start position is reproduced in the selected moving image that is being reproduced. A configuration other than this may also be adopted, such as a configuration in which a user directly designates a time period from the start of an extraction start position in a selected moving image.

Further, a configuration may be adopted so that, when a time period from a designated extraction start position until the end of the scene is shorter than n seconds, extraction is not performed or the user is asked whether to perform extraction from the designated extraction start position until the end of the scene.

Further, although according to the present embodiment the user designates an arbitrary extraction start position, for example, according to the MPEG method, encoding is performed in units referred to as "GOP (Group Of Pictures)". Therefore, a configuration may also be adopted that allows the user to designate an extraction start position at the boundary of a GOP when designating an extraction start position. It is thereby possible to create an extracted moving image file without decoding the original moving image signal and audio signal and thereafter encoding the signals again. More specifically, in S703, S706, and S712, data for a period of n seconds from the designated position or data to the end of the file that is in an encoded state is copied and recorded on the first recording medium 109 as an extracted moving image file.

Thus, according to the present embodiment, when a user designates an extraction start position in a moving image that has been captured in the first image capturing mode, a moving image of a time period that is the same as an image capturing time period in the second image capturing mode is automatically extracted and recorded as a separate moving image file. Therefore, with a simple operation, the user can extract and record a desired scene of n seconds from a moving image that has been captured in the first image capturing mode.

Further, in the second reproduction mode, moving image files that have been captured in the second image capturing mode and extracted moving image files may be selected and reproduced in succession. Therefore, in comparison to a case where captured moving images are merely reproduced, it is possible to obtain a different reproduction effect by successively reproducing different scenes every n seconds.

According to the above described embodiment, while reproducing moving images that are listed in the first reproduction list, an extraction start position is designated and extraction is performed for each relevant moving image that have been captured in the first image capturing mode. However, the present invention is not limited thereto. For example, a configuration may be adopted that automatically extracts and registers a moving image of a time period that is the same as a recording time period in the second image capturing mode from a moving image that has been captured in the first image capturing mode. In this case, the extraction position can be, for example, for all the moving images, the beginning of the relevant moving image or a center part in the image capturing time period. A configuration may also be adopted that allows a user to previously designate this type of extraction position.

According to the present invention, a moving image of a predetermined time period can be easily extracted from a recorded moving image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-153991, filed Jun. 29, 2009, which is hereby incorporated by reference herein in its entirety.

What is claimed is:

1. An image capturing apparatus, comprising:
an imaging unit;
an input unit configured to receive an instruction to start recording and an instruction to stop recording;
a recording unit configured to record a moving image signal obtained by said imaging unit on a recording medium, wherein the recording unit starts recording of the moving image signal in response to the instruction to start recording and stops recording of the moving image signal in response to the instruction to stop recording in a first image capturing mode, and starts recording of the moving image signal in response to the instruction to start recording and automatically stops recording of the moving image signal a predetermined period after recording of the moving image signal starts in a second image capturing mode;
a reproducing unit configured to reproduce a moving image signal from the recording medium;
an instruction unit configured to receive an instruction for designating a start position for extraction during reproduction of the moving image signal by said reproducing unit; and
a control unit configured to control said recording unit so as to automatically extract a moving image signal of the predetermined period from the start position for extraction designated by the instruction received by said instruction unit from a moving image signal that has been recorded on the recording medium in the first image capturing mode and is being reproduced, and record the extracted moving image signal on the recording medium, and
wherein if a period from the designated extraction start position to an end of the moving image signal that is being reproduced is shorter than the predetermined period, said control unit does not perform extraction of the moving image signal.

2. An image capturing apparatus comprising:
an imaging unit;
an input unit configured to receive an instruction to start recording and an instruction to stop recording;
a recording unit configured to record a moving image signal obtained by said imaging unit on a recording medium,
wherein the recording unit starts recording of the moving image signal in response to the instruction to start recording and stops recording of the moving image signal in response to the instruction to stop recording in a first image capturing mode, and starts recording of the moving image signal in response to the instruction to start recording and automatically stops recording of the moving image signal a predetermined period after recording of the moving image signal starts in a second image capturing mode;
a reproducing unit configured to reproduce a moving image signal from the recording medium;
an instruction unit configured to receive an instruction for designating a start position for extraction during reproduction of the moving image signal by said reproducing unit; and
a control unit configured to control said recording unit so as to automatically extract a moving image signal of the predetermined period from the start position for extraction designated by the instruction received by said instruction unit from a moving image signal that has been recorded on the recording medium in the first image capturing mode and is being reproduced, and record the extracted moving image signal on the recording medium, and
wherein if a period from the designated extraction start position to the end of the moving image signal that is being reproduced is longer than a threshold value that is set to a period that is shorter than the predetermined period, said control unit controls said recording unit so as to extract a moving image signal from the designated extraction start position to the end of the moving image signal that is being reproduced and record the extracted moving image signal on the recording medium, and if the period from the designated extraction start position to the end of the moving image signal that is being reproduced is shorter than the threshold value, said control unit controls said recording unit so as to extract a moving image signal of the predetermined period from a beginning of a moving image signal that has been recorded in the first image capturing mode that is to be next reproduced and record the extracted moving image signal on the recording medium.

3. A control method of an image capturing apparatus comprising imaging unit, and a recording unit configured to record a moving image signal obtained by said imaging unit on a recording medium, said method comprising:
an input steps of receiving an instruction to start recording and an instruction to stop recording;
a recording step of actuating said recording unit in an image capturing mode selected from a plurality of image capturing modes including a first image capturing mode where the recording unit starts recording of the moving image signal in response to the instruction to start recording and stops recording of the moving image signal in response to the instruction to stop recording, and a second image capturing mode where the recording unit starts recording of the moving image signal in response to the instruction to start recording and automatically stops recording of the moving image signal a predetermined period after recording of the moving image signal starts;
a reproducing step of reproducing a moving image signal from the recording medium;
an instruction step of receiving an instruction for designating a start position for extraction during reproduction of the moving image signal by said reproducing step; and
a control step of controlling said recording unit so as to automatically extract a moving image signal of the predetermined period from the start position for extraction designated by the instruction received in said instruction step from a moving image signal that has been recorded on the recording medium in the first image capturing mode and is being reproduced, and record the extracted moving image signal on the recording medium, and
wherein if a period from the designated extraction start position to an end of the moving image signal that is being reproduced is shorter than the predetermined period, said control unit does not perform extraction of the moving image signal.

4. A control method of an image capturing apparatus comprising imaging unit, and a recording unit configured to record a moving image signal obtained by said imaging unit on a recording medium, said method comprising:
an input steps of receiving an instruction to start recording and an instruction to stop recording;
a recording step of actuating said recording unit in an image capturing mode selected from a plurality of image capturing modes including a first image capturing mode where the recording unit starts recording of the moving image signal in response to the instruction to start recording and stops recording of the moving image signal in response to the instruction to stop recording, and a second image capturing mode where the recording unit starts recording of the moving image signal in response to the instruction to start recording and automatically stops recording of the moving image signal a predetermined period after recording of the moving image signal starts;
a reproducing step of reproducing a moving image signal from the recording medium;
an instruction step of receiving an instruction for designating a start position for extraction during reproduction of the moving image signal in said reproducing step; and
a control step of controlling said recording unit so as to automatically extract a moving image signal of the predetermined period from the start position for extraction designated by the instruction received in said instruction step from a moving image signal that has been recorded on the recording medium in the first image capturing mode and is being reproduced, and record the extracted moving image signal on the recording medium, and
wherein if a period from the designated extraction start position to the end of the moving image signal that is being reproduced is longer than a threshold value that is set to a period that is shorter than the predetermined period, said control step controls said recording unit so as to extract a moving image signal from the designated extraction start position to the end of the moving image signal that is being reproduced and record the extracted moving image signal on the recording medium, and if the period from the designated extraction start position to the end of the moving image signal that is being reproduced is shorter than the threshold value, said control step controls said recording unit so as to extract a moving image signal of the predetermined period from a beginning of a moving image signal that has been recorded in the first image capturing mode that is to be next reproduced and record the extracted moving image signal on the recording medium.

5. An image capturing apparatus, comprising:
an imaging unit;
a recording unit configured to record a moving image signal obtained by said imaging unit on a recording medium,
wherein the recording unit starts recording of the moving image signal in response to an instruction to start recording and stops recording of the moving image signal in response to an instruction to stop recording in a first image capturing mode, and starts recording of the moving image signal in response to the instruction to start recording and automatically stops recording of the moving image signal a predetermined period after recording of the moving image signal starts in a second image capturing mode;
a designation unit configured to designate a position in the moving image signal recorded on the recording medium;
a generation unit configured to generate, in accordance with the position designated by the designation unit, a new moving image signal of the predetermined period using the moving image signal, which has been recorded on the recording medium in the first image capturing mode, of the predetermined period from the designated position,
wherein if a period from the designated position to the end of the moving image signal is shorter than a threshold value that is set to a period that is shorter than the predetermined period, the generation unit generates the new moving image signal using the next moving image signal of the predetermined period from a beginning of the next moving image signal.

6. The apparatus according to claim 5, wherein if the period from the designated position to the end of the moving image signal is longer than the threshold value, the generation unit generates the new moving image signal using the moving image signal from the designated position to the end of the moving image signal.

7. The apparatus according to claim 5, further comprising:
a reproduction unit configured to reproduce a moving image signal from the recording medium,
wherein the designation unit designates the position during reproduction of the moving image signal by the reproduction unit.

8. The apparatus according to claim 5, wherein if the next moving image signal has been recorded in the second image capturing mode, the generation unit does not generates the new moving image signal.

9. The apparatus according to claim 5, wherein if a recording period of the next moving image signal is not equal or longer than the predetermined period, the generation unit does not generates the new moving image signal.

10. The apparatus according to claim 5, wherein the recording unit records the new moving image signal generated by the generation unit.

11. A control method of an image capturing apparatus comprising imaging unit, and a recording unit configured to record a moving image signal obtained by said imaging unit on a recording medium, said method comprising:
a recording step of actuating said recording unit in an image capturing mode selected from a plurality of image capturing modes including a first image capturing mode where the recording unit starts recording of the moving image signal in response to an instruction to start recording and stops recording of the moving image signal in response to an instruction to stop recording, and a second image capturing mode where the recording unit starts recording of the moving image signal in response to the instruction to start recording and automatically stops recording of the moving image signal a predetermined period after recording of the moving image signal starts;
a designation step of designating a position in the moving image signal recorded on the recording medium;
a generation step of generating, in accordance with the position designated in the designation step, a new moving image signal of the predetermined period using the moving image signal, which has been recorded on the recording medium in the first image capturing mode, of the predetermined period from the designated position,
wherein if a period from the designated position to the end of the moving image signal is shorter than a threshold value that is set to a period that is shorter than the predetermined period, the generation step generates the new moving image signal using the next moving image signal of the predetermined period from a beginning of the next moving image signal.

12. The method according to claim 11, wherein if the period from the designated position to the end of the moving image signal is longer than the threshold value, the generation step generates the new moving image signal using the moving image signal from the designated position to the end of the moving image signal.

13. The method according to claim 11, further comprising:
a reproduction step of reproducing a moving image signal from the recording medium,
wherein, in the designation step, the position is designated during reproduction of the moving image signal in the reproduction step.

14. The method according to claim 11, wherein if the next moving image signal has been recorded in the second image capturing mode, the generation step does not generates the new moving image signal.

15. The method according to claim 11, wherein if a recording period of the next moving image signal is not equal or longer than the predetermined period, the generation step does not generates the new moving image signal.

16. The method according to claim 11, wherein the recording step actuates the recording unit to record the new moving image signal generated in the generation step.

* * * * *